(12) United States Patent
Davis et al.

(10) Patent No.: US 8,957,811 B2
(45) Date of Patent: Feb. 17, 2015

(54) METHOD AND SYSTEM FOR PREDICTING ENERGY ON TARGET

(75) Inventors: William H. Davis, Columbia City, IN (US); John H. VanPatten, Columbia City, IN (US)

(73) Assignee: Raytheon Company, Waltham, MA (US)

( * ) Notice: Subject to any disclaimer, the term of this patent is extended or adjusted under 35 U.S.C. 154(b) by 354 days.

(21) Appl. No.: 13/475,244

(22) Filed: May 18, 2012

(65) Prior Publication Data

US 2013/0307726 A1    Nov. 21, 2013

(51) Int. Cl.
*H01Q 3/00*    (2006.01)

(52) U.S. Cl.
USPC .......................................................... 342/360

(58) Field of Classification Search
USPC .......................................... 342/360, 359, 361
See application file for complete search history.

(56) References Cited

U.S. PATENT DOCUMENTS

| | | | |
|---|---|---|---|
| 4,581,767 A | 4/1986 | Monsen | |
| 5,875,391 A | 2/1999 | Riley et al. | |
| 6,625,454 B1 | 9/2003 | Rappaport et al. | |
| 7,427,947 B1 | 9/2008 | Dark et al. | |
| 7,511,657 B2 | 3/2009 | Dark et al. | |
| 7,515,096 B2 | 4/2009 | Dark et al. | |
| 7,737,883 B2 | 6/2010 | Dark et al. | |
| 7,847,723 B1 | 12/2010 | Dark et al. | |
| 7,893,866 B2 | 2/2011 | Dark et al. | |
| 8,086,187 B1 | 12/2011 | Davis et al. | |
| 2009/0037149 A1 | 2/2009 | Vitek | |
| 2011/0263265 A1* | 10/2011 | Caretti et al. | ................. 455/450 |
| 2012/0040602 A1 | 2/2012 | Charland | |

FOREIGN PATENT DOCUMENTS

| | | |
|---|---|---|
| EP | 2 230 863 A2 | 9/2010 |
| WO | WO 2006/102257 A2 | 9/2006 |

OTHER PUBLICATIONS

German, et al.; "A Multi-Fidelity Modelling Approach for Cosite Interference Analysis;" Electromagnetic Compatibility (EMC); IEEE International Symposium; Aug. 17, 2009; pp. 195-200.
Young, et al.; "An Automated Measurement System for Cosite Interference Analysis;" IEEE; Electromagnetic Compatibility (EMC); Jul. 25, 2013; pp. 863-868.
PCT Search Report of the ISA for PCT/US2013/039406 dated Jul. 12, 2013.
Written Opinion of the ISA for PCT/US2013/039406 dated Jul. 12, 2013.
Application of VanPatten, et al.; U.S. Appl. No. 13/475,248, filed May 18, 2012.
Application of Davis, et al.; U.S. Appl. No. 13/475,233, filed May 18, 2012.

(Continued)

*Primary Examiner* — Harry Liu
(74) *Attorney, Agent, or Firm* — Daly, Crowley, Mofford & Durkee, LLP

(57) ABSTRACT

Methods and systems are disclosed for performing energy-on-target simulations for targeted regions to predict power or energy levels incident within the targeted region resulting from transmissions of a specific transmitting platform. Models may be used of a transmitting platform, a receiving platform, and a channel between the transmitting platform and the receiving platform to perform the simulation. In some embodiments, a plot may be generated of the energy-on-target results.

22 Claims, 12 Drawing Sheets

(56) References Cited

OTHER PUBLICATIONS

Invitation to Pay Additional Fees and, Where Applicable, Protest Fee dated Aug. 27, 2013 for PCT/US2013/039398.
Office Action dated May 9, 2014 for U.S. Appl. No. 13/475,248, filed May 18, 2012.
PCT Search Report and Written Opinion of the ISA for PCT/US2013/039398 dated Nov. 8, 2013.
COMSET Brochure; "Communication System Engineering Tool;" Raytheon; Nov. 11, 2009; 2 pages.
PCT Search Report of the ISA for PCT/US2013/039421 dated Feb. 13, 2013.
PCT Written Opinion of the ISA for PCT/US2013/039421 dated Feb. 13, 2013.
Response to May 9, 2014 Office Action as filed on Aug. 8, 2014 for U.S. Appl. No. 13/475,248, filed May 18, 2012.
Office Acton dated Jul. 2, 2014 for U.S. Appl. No. 13/475,233, filed May 18, 2012.
Response to Jul. 2, 2014 Office Action as filed on Jul. 18, 2014 for U.S. Appl. No. 13/475,233, filed May 18, 2012.
Office Action dated Sep. 19, 2014 for U.S. Appl. No. 13/475,233, filed May 18, 2012.

\* cited by examiner

METHOD AND SYSTEM FOR PREDICTING ENERGY ON TARGET

FIELD

Subject matter disclosed herein relates to radio frequency (RF) systems and, more particularly, to techniques for predicting received energy or power levels across a region of interest generated by an RF transmitting system.

BACKGROUND

There are various applications where it may be beneficial to know the energy levels that will result across a targeted region from transmissions from a specific transmitting platform. For example, in jamming applications, the overall effect of a jamming operation may depend upon the level of energy that a jamming transmitter can place at a receiver location.

Knowledge of energy levels generated across a targeted region from a transmitting platform may also be useful for making design modifications to a transmitter design so that a more desirable energy pattern may be achieved for performing a particular application. Prior techniques for estimating energy-on-target typically utilized a simplified ray-optical approach for an antenna pattern that treats a directional antenna like a triangle that puts a circular or oval pattern of uniform power on a targeted region. In other words, these prior techniques indicated a constant signal level inside an antenna beam width, with little or no information outside the antenna beam width. Such approaches limit both the accuracy and the usefulness of the resulting data.

Techniques and systems are needed for more accurately predicting energy-on-target information for a transmitting system.

SUMMARY

In accordance with the concepts, systems, circuits, and techniques described herein, a machine-implemented method for simulating energy-on-target in a targeted region for a radio transmission system, comprises: receiving input information specifying a transmitter platform model to be used as a transmitter for an energy-on-target analysis; receiving input information specifying a receiver platform model to be used as a receiver for the energy-on-target analysis; receiving input information specifying a propagation model to be used for a channel between the transmitter and the receiver for the energy-on-target analysis; receiving input information specifying a number of receiver locations for which energy-on-target information is desired; and performing a series of link analyses for the number of receiver locations using the transmitter platform model, the receiver platform model, and the channel propagation model, wherein each link analysis in the series of link analyses determines a receive power level at a corresponding receiver location taking into consideration transmit power level, transmit and receive antenna gain at the corresponding receiver location, propagation power loss in the channel, and polarization loss at the corresponding receiver location.

In accordance with another aspect of the concepts, systems, circuits, and techniques described herein, a system to simulate energy-on-target in a targeted region for a radio transmission system, comprises: one or more processors to: receive input information from a user specifying a transmitter platform model and a receiver platform model for an energy-on-target analysis; receive input information from a user specifying a propagation model to be used for a channel between a transmitter platform and a receiver platform for the energy-on-target analysis; receive input information from a user specifying a location and attitude of the transmitter platform for the energy-on-target analysis; receive input information from a user specifying a plurality of receiver platform locations for the energy-on-target analysis; and perform a series of link analyses for the plurality of receiver platform locations using the specified transmitter platform model, the specified receiver platform model, and the specified channel propagation model, wherein each link analysis in the series of link analyses determines a receive power level at a corresponding receiver platform location taking into consideration transmit power level, transmit and receive antenna gain at the corresponding receiver platform location, propagation power loss in the channel, and polarization loss at the corresponding receiver platform location; and a memory to store results of the series of link analyses.

In accordance with a further aspect of the concepts, systems, circuits, and techniques described herein, a system to simulate energy-on-target in a targeted region for a radio transmission system, comprises: means for receiving input information specifying a transmitter platform model to be used as a transmitter for an energy-on-target analysis; means for receiving input information specifying a receiver platform model to be used as a receiver for the energy-on-target analysis; means for receiving input information specifying a propagation model to be used for a channel between the transmitter and the receiver for the energy-on-target analysis; means for receiving input information specifying a number of receiver locations for which energy-on-target information is desired; and means for performing a series of link analyses for the number of receiver locations using the transmitter platform model, the receiver platform model, and the channel propagation model, wherein each link analysis in the series of link analyses determines a receive power level at a corresponding receiver location taking into consideration transmit power level, transmit and receive antenna gain at the corresponding receiver location, propagation power loss in the channel, and polarization loss at the corresponding receiver location.

BRIEF DESCRIPTION OF THE DRAWINGS

The foregoing features of this invention, as well as the invention itself, may be more fully understood from the following description of the drawings in which.

DETAILED DESCRIPTION

Subject matter described herein relates to tools that may be used to accurately predict received energy or power levels across a specified target area resulting from transmissions from a specified transmitting platform. Platform models may be generated to accurately describe the operation of a transmitter and a receiver in an environment of interest. A propagation model may also be specified to more accurately predict signal propagation between a transmitter and a receiver in the subject environment. In at least one approach, as will be described in greater detail, a user is permitted to select a propagation model from a library of different models to use in an analysis. Link calculations may then be performed for a series of different receiver locations using the transmitter platform model, the receiver platform model, and the propagation model. The results of the link calculations may then be stored and/or plotted. As is well known, the word "power" refers to a rate at which energy is delivered per unit of time. As such, in the discussion that follows, the results of an energy-on-target analysis may be expressed using either energy or power.

Figure 1:
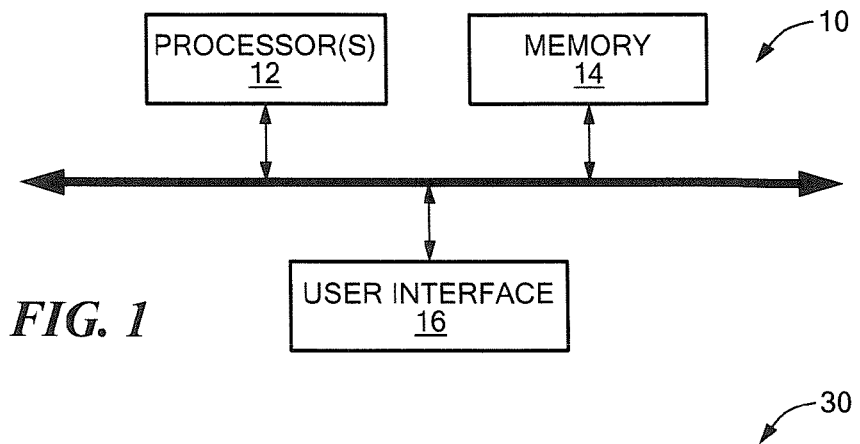
FIG. 1 is a block diagram illustrating an example computing system architecture that may be used in one or more implementations.

FIG. 1 is a block diagram illustrating an example computing system architecture 10 that may be used in one or more implementations. As illustrated, the computing system architecture 10 may include: one or more digital processors 12, a memory 14, and a user interface 16. A bus 18 and/or other structure(s) may be provided for establishing interconnections between various components of computing system architecture 10. In some implementations, one or more wired or wireless networks may be provided to support communication between elements of computing system 10. Digital processor(s) 12 may include one or more digital processing devices that are capable of executing programs or procedures to provide functions and/or services for a user. Memory 14 may include one or more digital data storage systems, devices, and/or components that may be used to store data and/or programs for use by other elements of architecture 10. User interface 16 may include any type of device, component, or subsystem for providing an interface between a user and system 10.

Digital processor(s) 12 may include, for example, one or more general purpose microprocessors, digital signals processors (DSPs), controllers, microcontrollers, application specific integrated circuits (ASICs), field programmable gate arrays (FPGAs), programmable logic arrays (PLAs), programmable logic devices (PLDs), reduced instruction set computers (RISCs), and/or other processing devices or systems, including combinations of the above. Digital processor(s) 12 may be used to, for example, execute an operating system and/or one or more application programs. In addition, digital processor(s) 12 may be used to implement, either partially or fully, one or more of the analysis processes or techniques described herein in some implementations.

Memory 14 may include any type of system, device, or component, or combination thereof, that is capable of storing digital information (e.g., digital data, computer executable instructions and/or programs, etc.) for access by a processing device or other component. This may include, for example, semiconductor memories, magnetic data storage devices, disc based storage devices, optical storage devices, read only memories (ROMs), random access memories (RAMs), non-volatile memories, flash memories, USB drives, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, and/or other digital storage suitable for storing electronic instructions and/or data. In some implementations, memory 14 may store one or more programs for execution by processor(s) 12 to implement analysis processes or techniques described herein. Memory 14 may also store one or more databases or libraries of model data for use during various analyses.

User interface 16 may include one or more input/output devices (e.g., a display, a mouse, a trackball, a keyboard, a numerical keypad, speakers, a microphone, etc.) to allow users to interact with computing system architecture 10. User interface 16 may also include executable software and a processor that is capable of soliciting input from a user for use in the performance of various analyses and/or other processes. In at least one implementation, user interface 16 includes a graphical user interface (GUI). Although user interface 16 is illustrated as a separate unit, it should be understood that, in some implementations, some of the user interface functions may be performed within processor(s) 12.

As will be described in greater detail, in some implementations, a user will be able to define an energy-on-target analysis to be performed via user interface 16. One or more processes may then be executed within processors 12 to carry out the energy-on-target analysis. The results of an analysis (e.g., data, a plot, a map with a plot overlay, etc.) may then be presented to a user via user interface 16 or saved to memory 14. During the performance of the analysis, one or more databases or libraries stored within memory 14 may be accessed to provide models and/or other data for use in the analysis.

It should be appreciated that the computing system architecture 10 of FIG. 1 represents one example of an architecture that may be used in an implementation. Other architectures may alternatively be used. It should be appreciated that all or part of the various devices, processes, or methods described herein may be implemented using any combination of hardware, firmware, and/or software.

Figure 2:
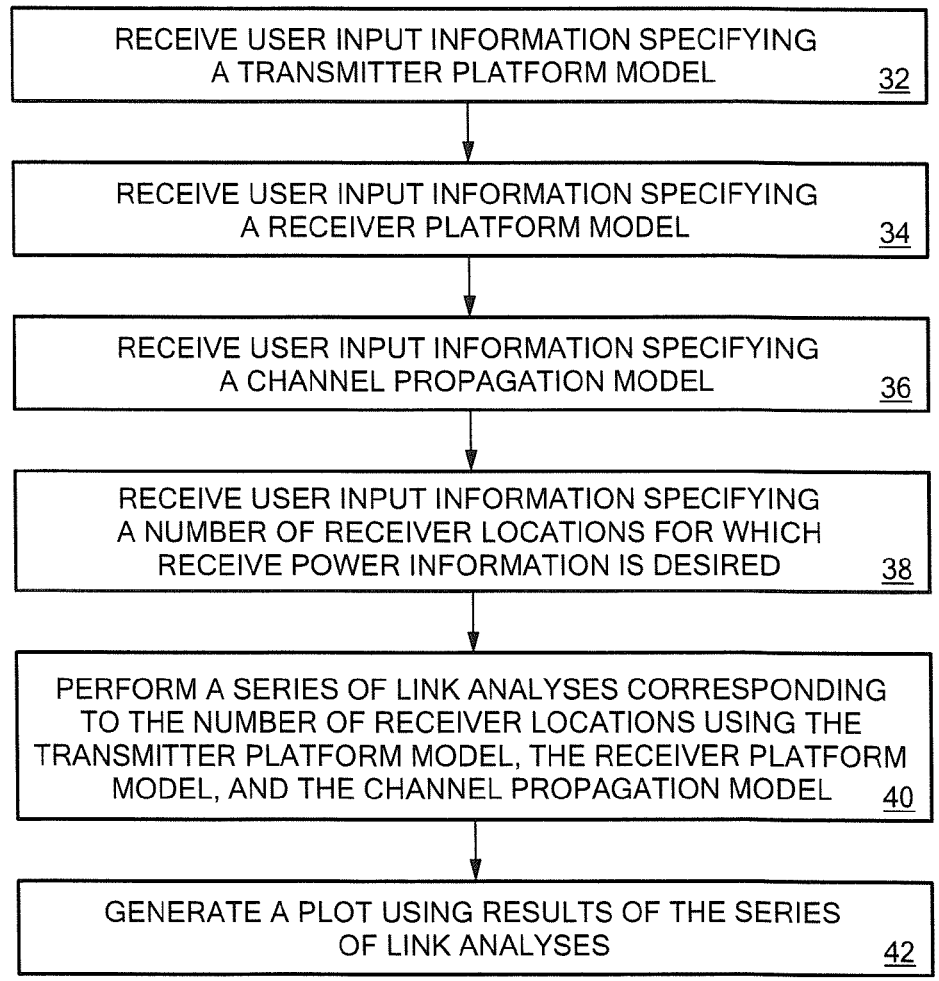
FIG. 2 is a flow chart illustrating a method for use in simulating energy-on-target for a region of interest in accordance with an implementation.

FIG. 2 is a flow diagram showing an example process for use in predicting energy-on-target for a region of interest in accordance with an implementation.

The rectangular elements (typified by element 32 in FIG. 2) are herein denoted "processing blocks" and may represent computer software instructions or groups of instructions. It should be noted that the flow diagram of FIG. 2 represents one exemplary embodiment of a design described herein and variations in such a diagram, which generally follow the process outlined, are considered to be within the scope of the concepts, systems, and techniques described and claimed herein.

Alternatively, the processing blocks may represent operations performed by functionally equivalent circuits, such as a digital signal processor circuit, an application specific integrated circuit (ASIC), or a field programmable gate array (FPGA). Some processing blocks may be manually performed while other processing blocks may be performed by a processor. The flow diagram does not depict the syntax of any particular programming language. Rather, the flow diagram illustrates the functional information one of ordinary skill in the art may require to fabricate circuits and/or to generate computer software to perform the processing required of the particular apparatus. It should be noted that many routine program elements, such as initialization of loops and variables and the use of temporary variables may not be shown. It will be appreciated by those of ordinary skill in the art that unless otherwise indicated herein, the particular sequence described is illustrative only and can be varied without departing from the spirit of the concepts described and/or claimed herein. Thus, unless otherwise stated, the processes described below are unordered meaning that, when possible, the sequences shown in FIG. 3 can be performed in any convenient or desirable order.

Turning now to FIG. 2, an example method 30 for predicting energy-on-target for a region of interest will be described. User input information is first received that specifies a transmitter platform model to be used for an energy-on-target analysis (block 32). The transmitter platform model is a model of a platform that includes the transmitter that will transmit energy toward the region of interest. The user may select the transmitter platform model from a plurality of platform models stored in a model library or database. User input information may also be received that specifies a receiver platform model to be used for the energy-on-target analysis (block 34). The receiver platform model is a model of a platform that includes the radio receiver that will receive energy transmitted from the transmitter platform. As with the transmitter platform model, the user may select the receiver platform model from a plurality of such models stored in a model library.

User input information may also be received that specifies a channel propagation model to characterize radio frequency propagation that will take place in a channel between the transmitter platform and the receiver platform (block 36). A user may, for example, select a propagation model from a list of available models in one implementation. User input information may also be received that specifies a number of receiver locations at which receiver power level (or energy-on-target) information is desired (block 38). The receiver locations may be specified in any known manner. In some implementations, for example, a user may specify a minimum and maximum range, a range step, a minimum and maximum bearing, and a bearing step to define locations for which receive power data is desired. In other implementations, a user may specify a particular area and a number of points within that area where receive power information is desired.

After the input information has been collected and the models have been generated or retrieved, a series of link analysis operations may be performed for the specified receiver locations using the transmitter platform model, the receiver platform model, and the channel propagation model (block 40). During the analyses, the location of the receiver platform may be swept across the region of interest (e.g., swept in range and bearing) and the resulting receive powers may be calculated and stored. The results of the link analyses may then be plotted (block 42). In some implementations, the plot may be overlaid on an electronic map of the region of interest (e.g., a Google Earth map, etc.) to give a graphical display of energy-on-target in the region.

Figure 3:
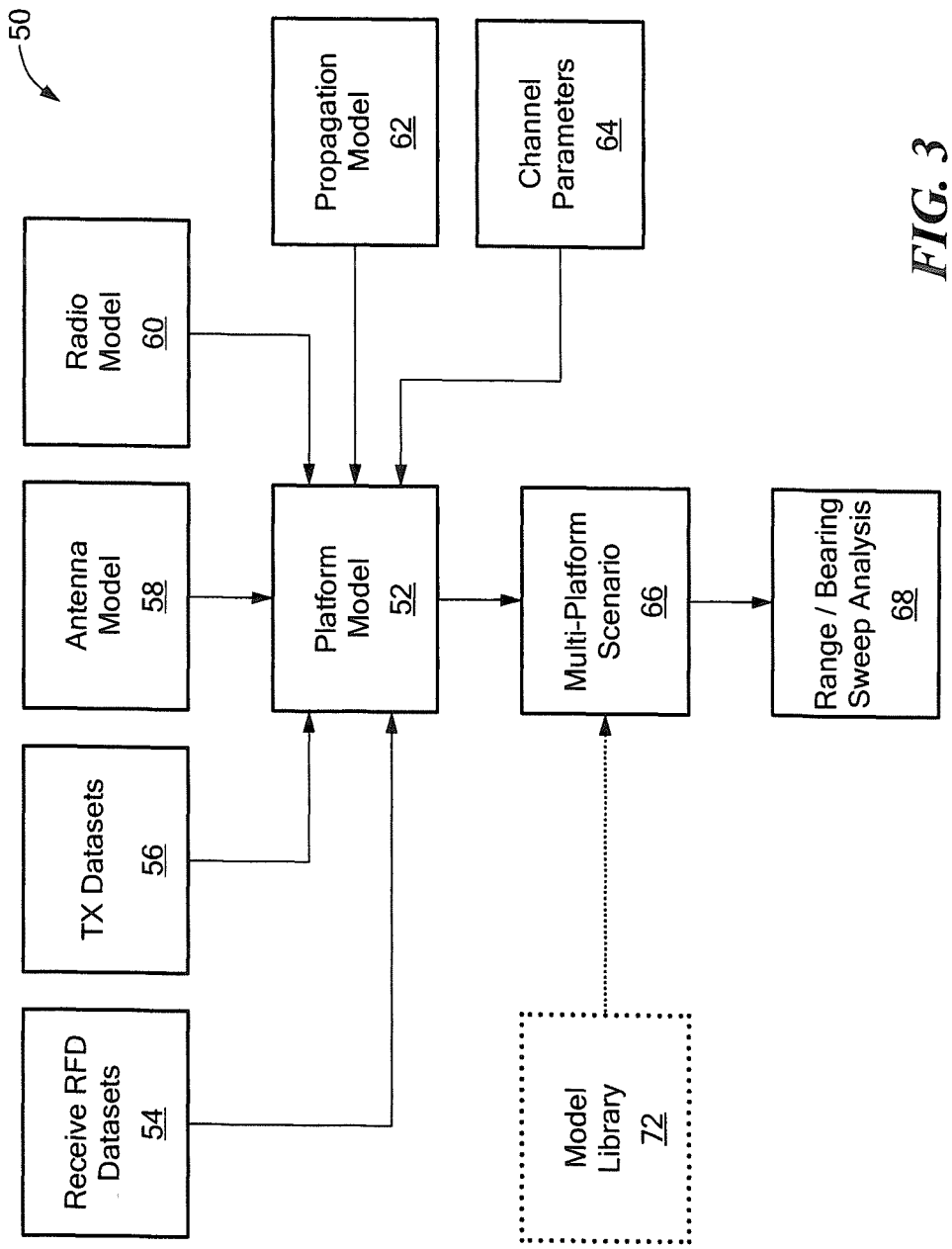
FIG. 3 is a block diagram illustrating an example analysis system for simulating energy-on-target for a region of interest in accordance with an implementation.

FIG. 3 is a block diagram illustrating an example analysis system 50 for simulating/predicting energy-on-target for a region of interest in accordance with various implementations. In at least one implementation, the system 50 may be part of, for example, a suite of system analysis tools for analyzing various aspects of a system design. One such suite of tools is the COMSET analysis system developed and owned by Raytheon Corporation. With reference to FIG. 3, the analysis system 50 may include: a platform model application 52, a receiver radio frequency distribution (RFD) datasets application 54, a transmit datasets application 56, an antenna model application 58, a radio model application 60, a propagation model application 62, a channel parameters application 64, a multi-platform scenario application 66, and a range/bearing sweep analysis application 68. The applications 52, 54, 56, 58, 60, 62, 64, 66, 68 of FIG. 3 may represent, for example, individual applications executing in one or more processors (e.g., processor(s) 12 of computing system architecture 10 of FIG. 1). Some or all of the applications 52, 54, 56, 58, 60, 62, 64, 66, 68 may also, in some implementations, have an associated graphical user interface (GUI) to facilitate entry of information by a user. Analysis system 50 may also include a model library/database 72 to store models and datasets created by the various applications. Model library 72 may be stored within memory of system 50 (e.g., memory 14 of computing system architecture 10 of FIG. 1).

As will be described in greater detail, receive RFD datasets application 54, transmit datasets application 56, antenna model application 58, radio model application 60, propagation model application 62, and channel parameters application 64, may each be used to create and/or modify models and datasets for use in energy-on-target analyses and/or other analyses. Platform model application 52 is operative for generating platform models for use during energy-on-target analyses using models and datasets generated by the other applications 54, 56, 58, 60, 62, and 64. Multi-Platform Scenario application 66 allows a user to specify multiple platform models to be used during an energy-on-target analysis. Range-bearing sweep analysis application 68 is operative for performing the calculations required to generate the energy-on-target information for a given scenario. Range-bearing sweep analysis application 68 may allow a user to specify, among other things, a propagation model to use for a channel between a transmitter platform and a receiver platform and region of interest information specifying a region for which energy-on-target information is desired. Range-bearing sweep analysis application 68 may also allow a user to specify a type of plot to use to plot the results of an energy-on-target analysis.

Figure 4:
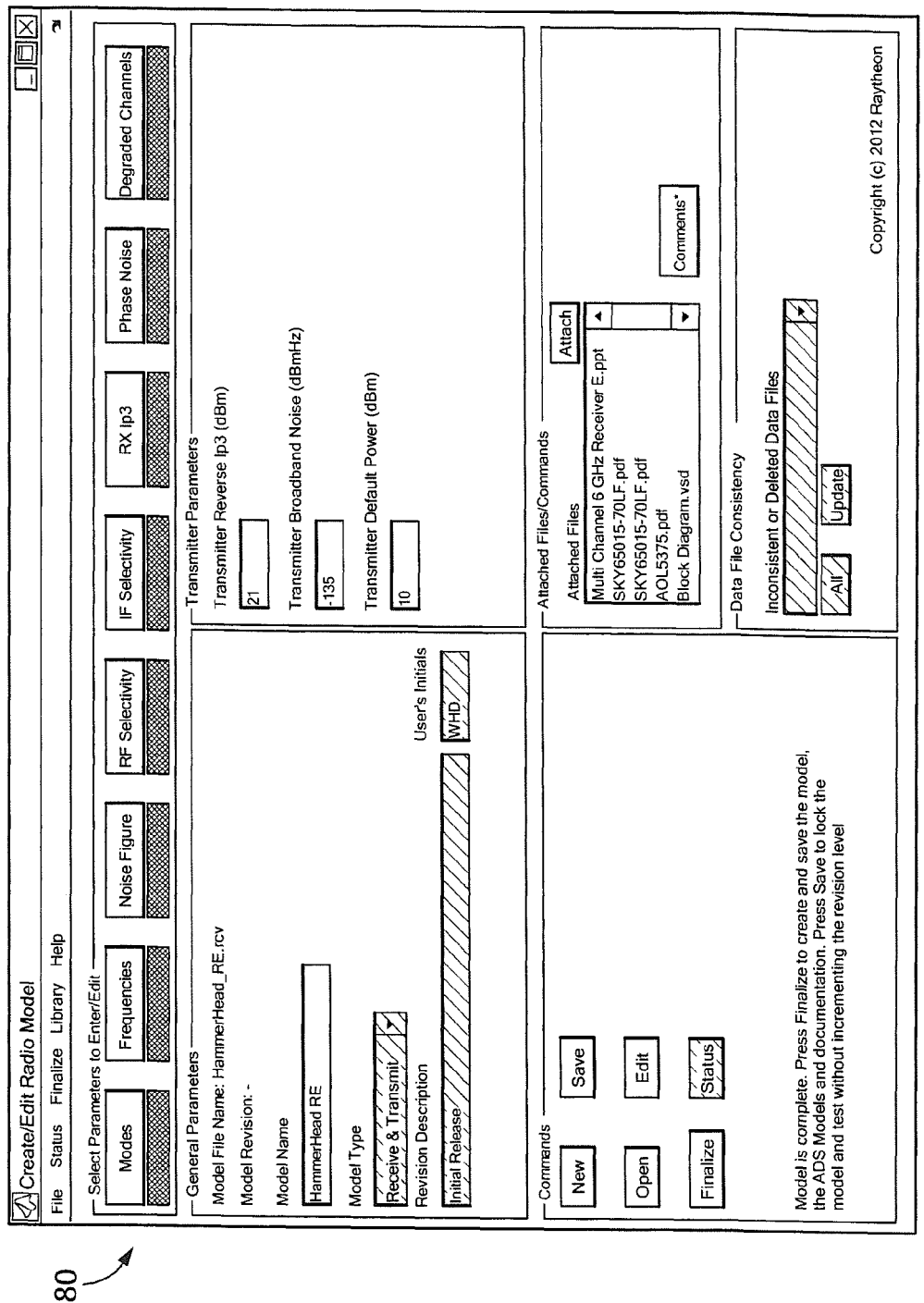
FIG. 4 is a screen shot of an example GUI screen that may be used in connection with a radio model application in accordance with an implementation.

Radio model application 60 of FIG. 3 may be used to create radio models in one or more embodiments. FIG. 4 is a screen shot of a GUI screen 80 that may be used in connection with radio model application 60 in accordance with an implementation. A radio model contains data characterizing an exciter and receiver's performance. However, this model does not contain all data for an entire transmitter and receiver system. For the transmitter system, a power amplifier, filter, coax, etc. may be added to the exciter performance, but the final transmitter performance data is generated in Agilent's Advanced Design System (ADS) (or some other electronic design automation software). For the receiver, a low noise amplifier, filter, coax, etc. may be added to the radio (receiver) model where the data for just these components is simulated in ADS. These components can be referred to as the Radio Frequency Distribution (RFD).

After the radio model is created, an ADS exciter model may be automatically generated. The ADS exciter model is created from the modulation, phase noise, thermal noise, power, and reverse $3^{rd}$ order intercept data in the radio model. This exciter model, along with other components (power amplifier, etc.) that may be included, is simulated in ADS to create a transmit dataset. The data created includes output power as a function of frequency, thermal and phase noise power spectral density as a function of frequency and offset frequency, selectivity after power amplifier, and reverse $3^{rd}$ order intercept power. The receiver RFD components are also simulated in ADS and characterized for noise figure as a function of frequency, selectivity as a function of frequency and offset frequency, and $3^{rd}$ order intercept power as a function of frequency and offset frequency. The output from this simulation is the receive RFD dataset. The data imported into radio model application 60 can be theoretical, simulated, and/or measured. Once a radio model has been created using radio model application 60, it may be stored in and accessed from model library 72 of FIG. 3.

Figure 5:
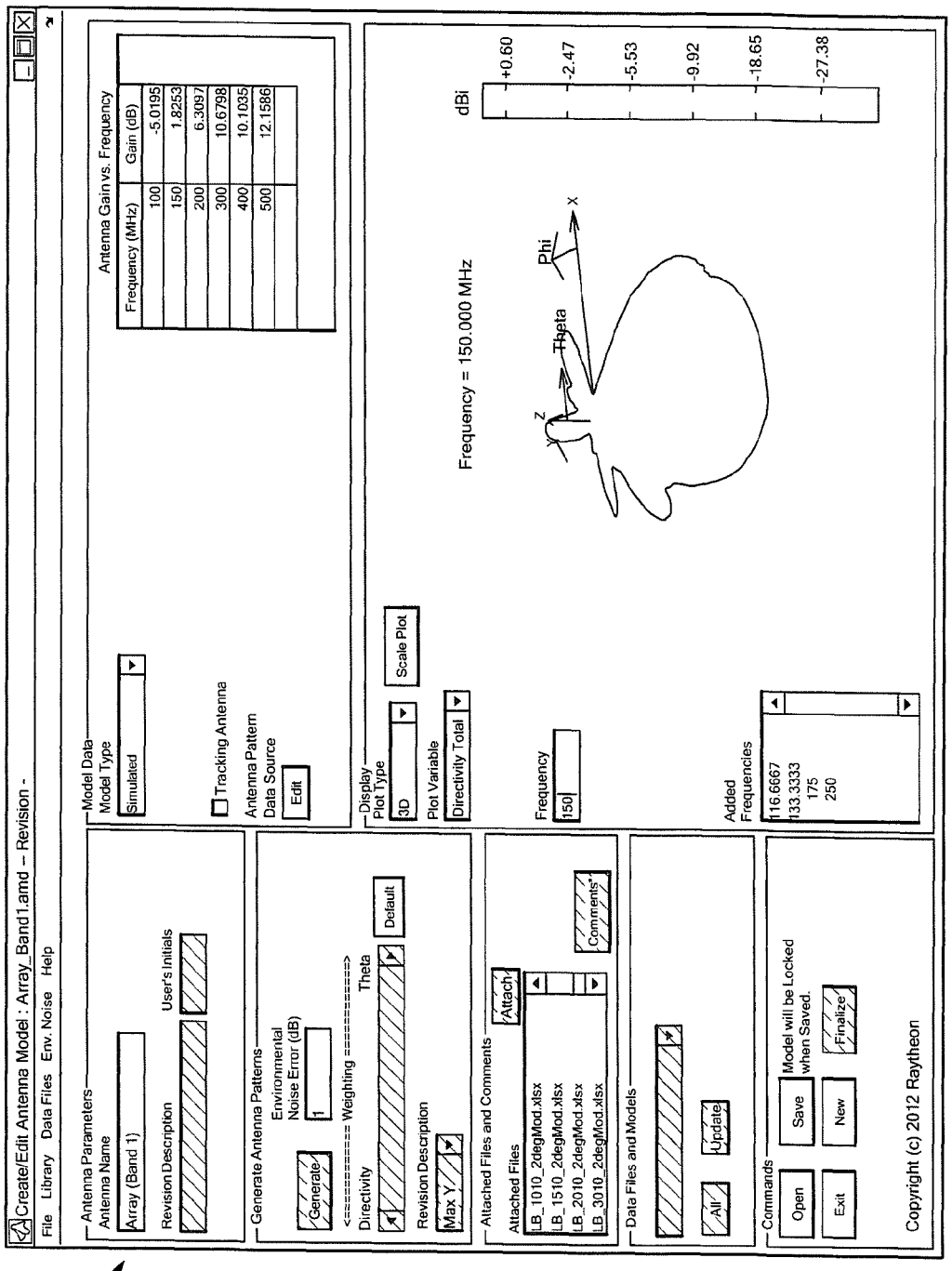
FIG. 5 is a screen shot of an example GUI screen that may be used in connection with an antenna model application in accordance with an implementation.

Antenna models may be created in antenna model application 58 of FIG. 3 in accordance with some embodiments. FIG. 5 is a screen shot of an example GUI screen 90 that may be used in connection with antenna model application 58 in accordance with an implementation. In at least one implementation, antenna model application 58 may allow a user to create theoretical antenna patterns (e.g., dipole, monopole, and directional) for use in antenna models for energy-on-target simulations. Antenna model application 58 may also, or alternatively, allow a user to import data from electromagnetic (EM) simulator programs (e.g., CST Microwave Studio, etc.) for use in antenna models for energy-on-target simulations. In some implementations, antenna model application 58 may also allow a user to import measured antenna data for use in antenna models for energy-on-target simulations. This application may also include functionality to provide the complex orthogonal components of directivity (i.e., directivity theta and phi and their phase) in spherical coordinates. Once an antenna model has been created using antenna model application 58, it can be stored in and accessed from model library 72 of FIG. 3.

Figure 6:
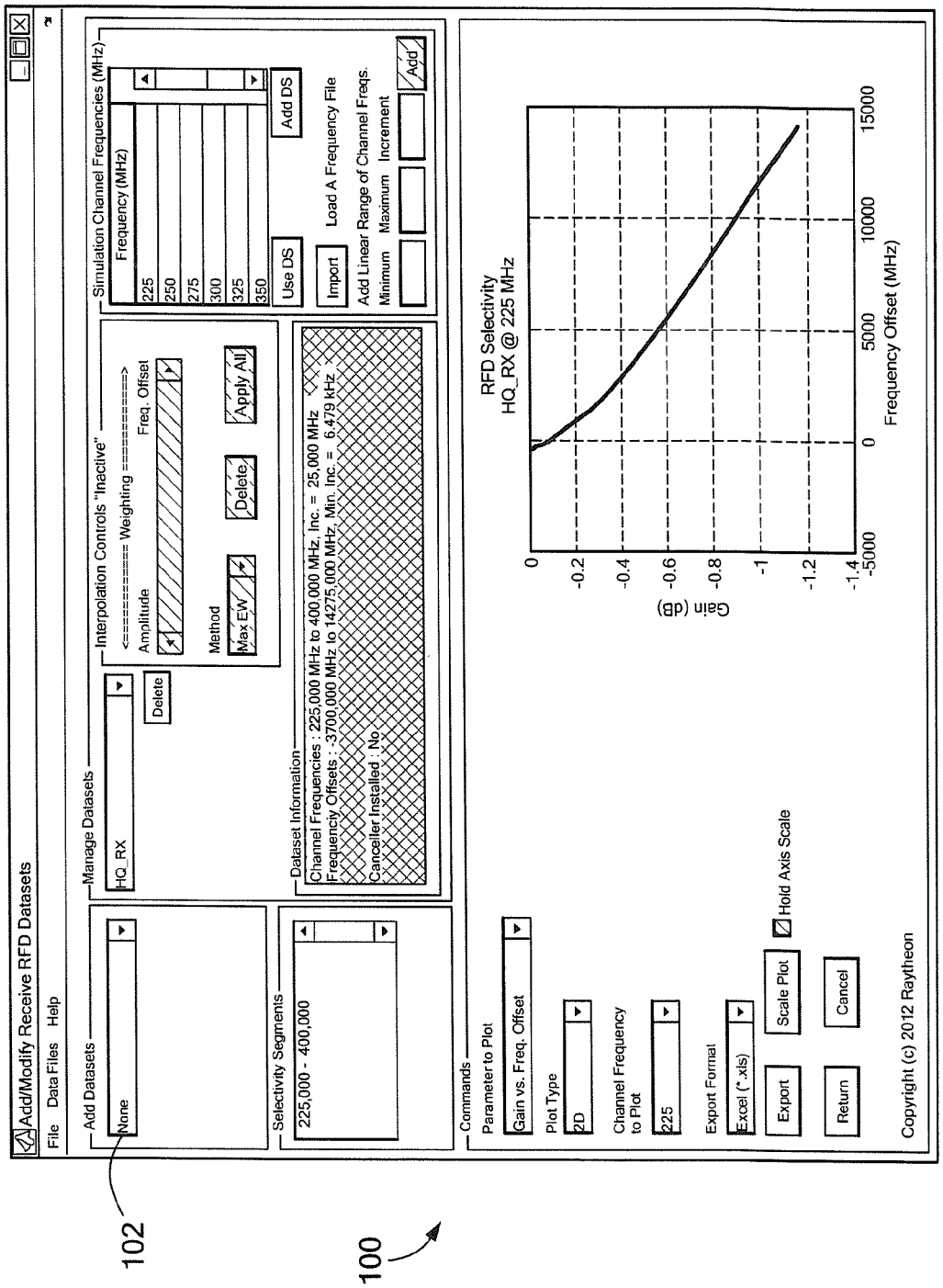
FIG. 6 is a screen shot of an example GUI screen that may be used in connection with a receive RFD dataset application in accordance with an implementation.
Figure 7:
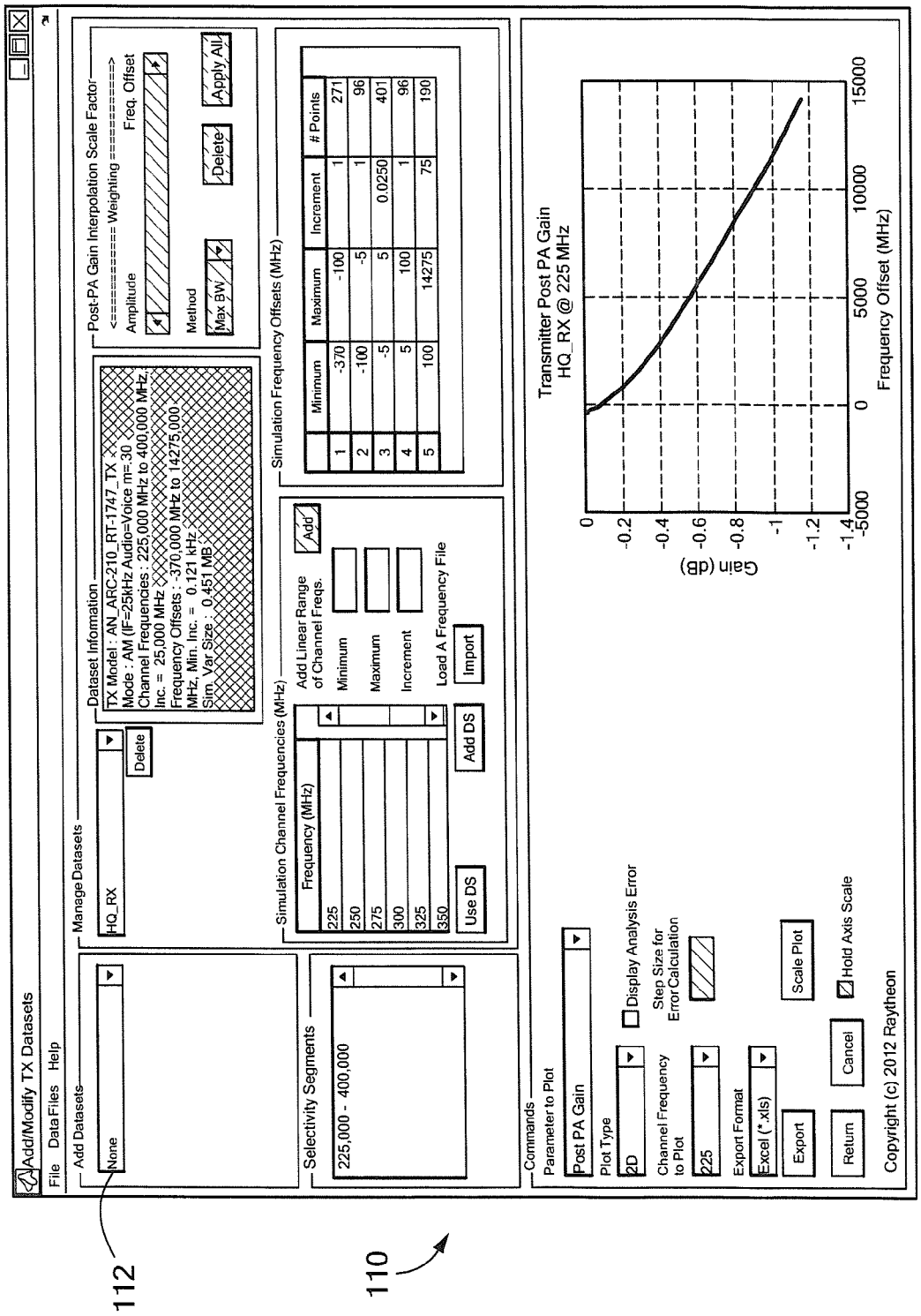
FIG. 7 is a screen shot of an example GUI screen that may be used in connection with a transmit datasets application in accordance with an implementation.

Receive RFD dataset application 54 of FIG. 3 may be used to add and/or modify RFD datasets. FIG. 6 is a screen shot of an example GUI screen 100 that may be used in connection with receive RFD dataset application 54 in accordance with an implementation. As illustrated, GUI screen 100 includes a pull-down menu 102 that may be used by a user to add one or more RFD datasets to a platform model. Transmit datasets application 56 of FIG. 3 may be used to add and/or modify stored transmit datasets. FIG. 7 is a screen shot of an example GUI screen 110 that may be used in connection with transmit datasets application 56 in accordance with an implementation. As illustrated, GUI screen 110 includes a pull-down menu 112 for use in adding one or more transmit datasets to a platform model.

Figure 9:
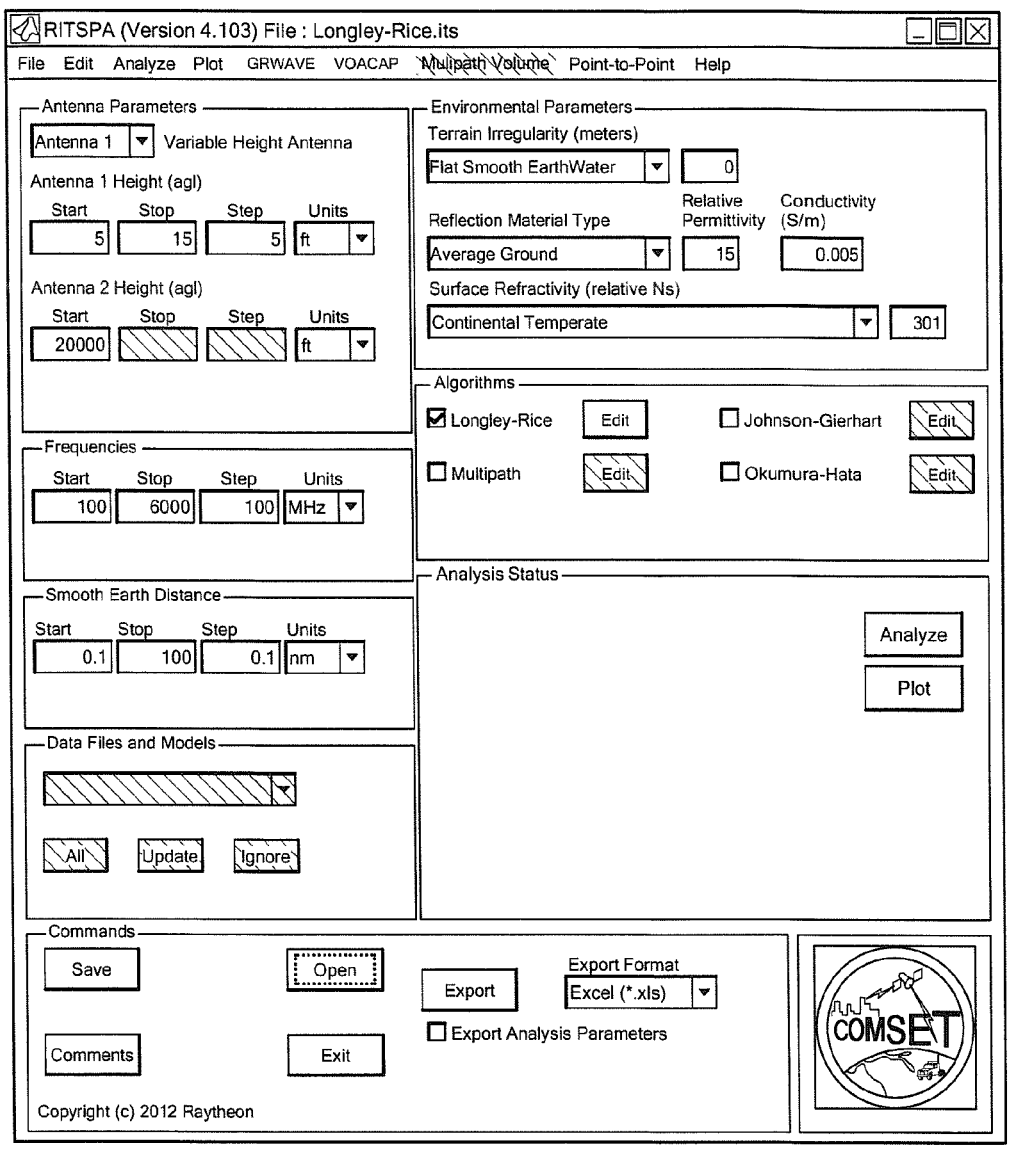
FIG. 9 is a screen shot of an example GUI screen that may be used in connection with a propagation model application in accordance with an implementation.

Propagation models may be created or modified in propagation model application 62 of FIG. 3 in some implementations. FIG. 9 is a screen shot of an example GUI screen 130 that may be used in connection with propagation model application 62 in accordance with an implementation. The propagation model application 62 may be used to define a specific propagation model and environmental characteristics that will be used for an energy-on-target analysis. Some propagation model algorithms that may be available include, for example: Longley-Rice, Johnson-Gierhart, 2-ray Multipath, Okumura-Hata, VOACAP, and GRWAVE. The Longley-Rice model may be used, for example, in area or point-to-point modes. In a point-to-point mode, Digital Terrain Elevation Data (DTED) data is used. In this case, propagation data is dependent on the specific location of the transmitter and the receiver on Earth.

As described above, platform model application 52 of FIG. 3 may be used to generate platform models for use during energy-on-target simulations. A platform model is a data structure that includes data characterizing the performance of one or more radio channels. A radio channel may be comprised of radio equipment such as antennas, transmitters, receivers, coax, filters, amplifiers, couplers, and/or other components. To generate a platform model, platform model application 52 may require input from one or more of: receive RFD datasets application 54, transmit datasets application 56, antenna model application 58, radio model application 60, propagation model application 62, and channel parameters application 64 in some implementations.

Figure 10:
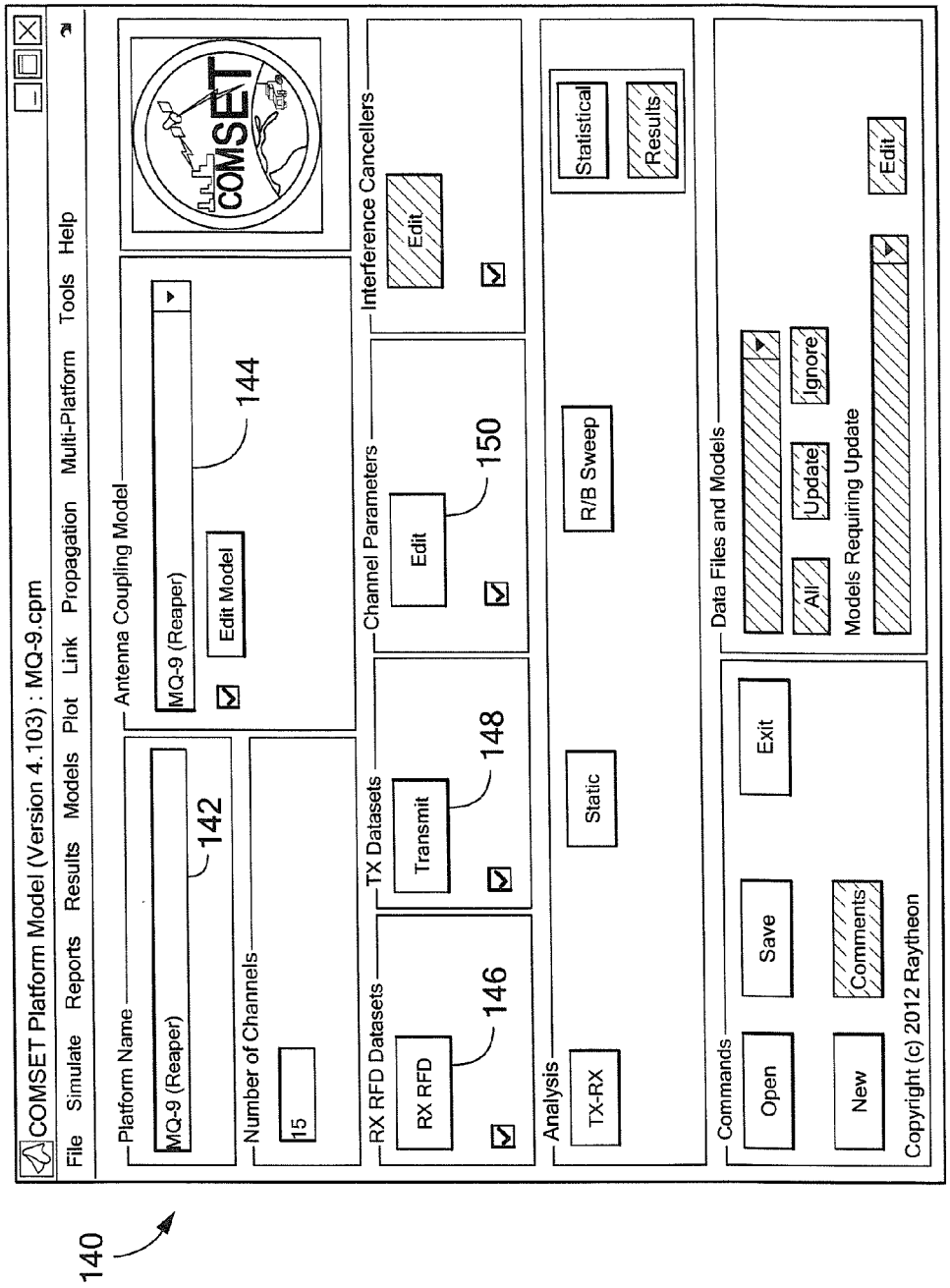
FIG. 10 is a screen shot of an example GUI screen that may be used in connection with a platform model application in accordance with an implementation.

FIG. 10 is a screen shot of an example GUI screen 140 that may be used in connection with a platform model application 52 in accordance with an implementation. As illustrated, GUI screen 140 includes a text box 142 that can be used to enter a name for a corresponding platform. A pull-down menu 144 may also be provided that allows a user to specify an antenna coupling model to use for the platform. GUI screen 180 may also include an "RX RFD" button 146 for use in importing receive data sets into platform model application 52. In some implementations, selection of the "RX RFD" button 146 will open the GUI screen 100 of FIG. 6 associated with receive RFD dataset application 54. GUI screen 140 may further include a "Transmit" button 148 for use in importing transmitter data sets into platform model application 52. Selection of the "Transmit" button 148 may open the GUI screen 110 of FIG. 7 associated with transmit dataset application 56. In addition, GUI screen 140 may include an "Edit" button 150 that may be used to import channel parameter information into platform model application 52.

Figure 8:
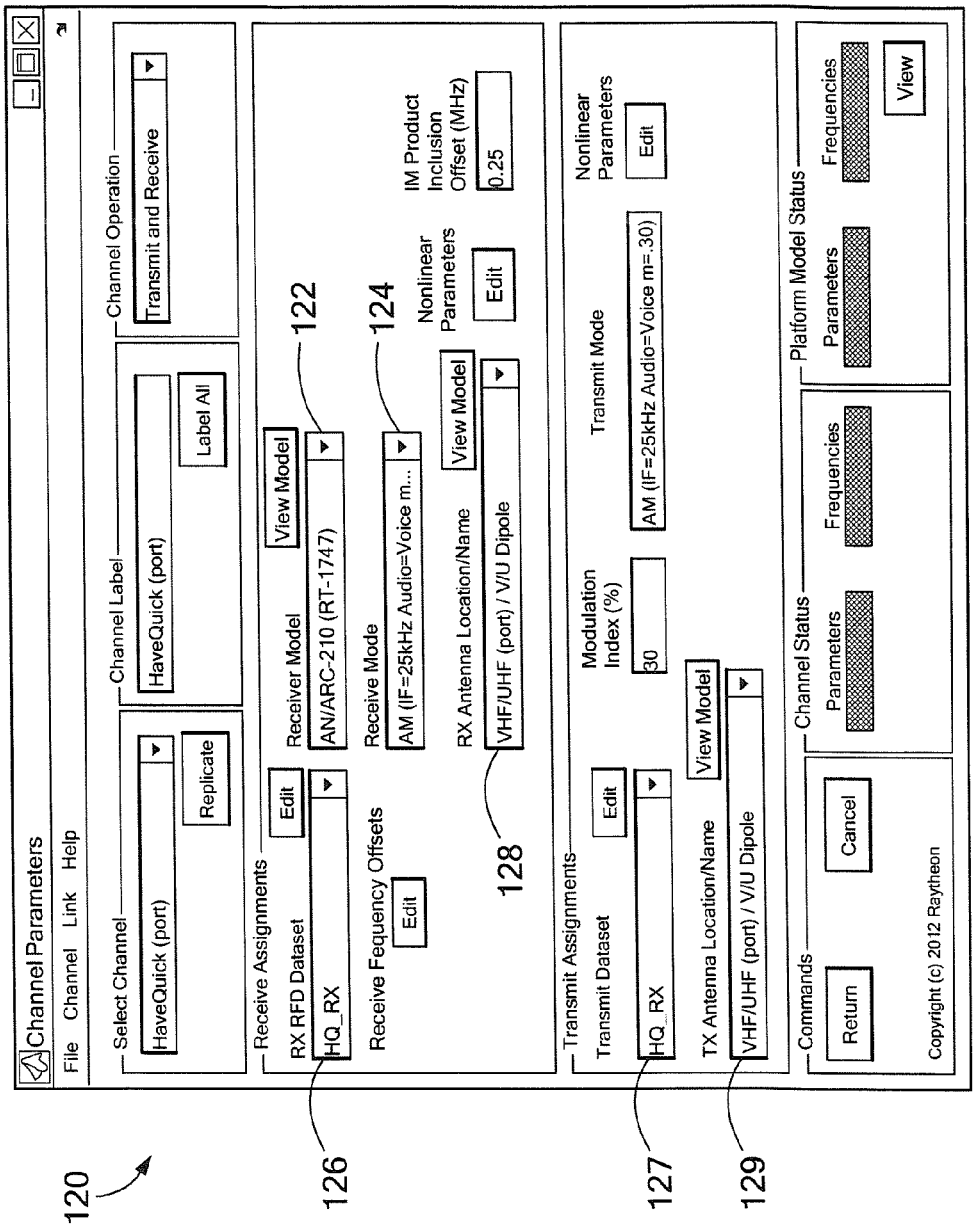
FIG. 8 is a screen shot of an example GUI screen that may be used in connection with a channel parameters application in accordance with an implementation.

From the platform model application, the "Edit" button 150 is selected to open the channel parameters application 64. The channel parameters application 64 may be used to name and define radio channels by selecting an RFD data set, a receiver model, a receive mode, a receive antenna, a transmit data set, and/or a transmit antenna for the channel. FIG. 8 is a screen shot of an example GUI screen 120 that may be used in connection with channel parameters application 64 in accordance with an implementation. The receive RFD dataset, receiver model (from radio model), and transmit dataset are selected from this GUI 120. The receiver model (radio model) is selected from a pull-down menu 122. The receiver mode, which determines the specific set of data used in the radio model, is selected from a pull-down menu 124. The receive RFD data (simulated in ADS) is selected from a pull-down menu 126. The transmitter dataset is selected from a pull-down menu 127.

For a selected receive RFD dataset, a user may be able to select a receive antenna and location using a receive antenna location/name pull-down menu 128. For a selected transmit dataset, a user may be able to select a transmit antenna and location using a transmit antenna location/name pull-down menu 129. In this manner, channels may be defined by a specific set of equipment as well as by a specific operating mode.

Figure 11:
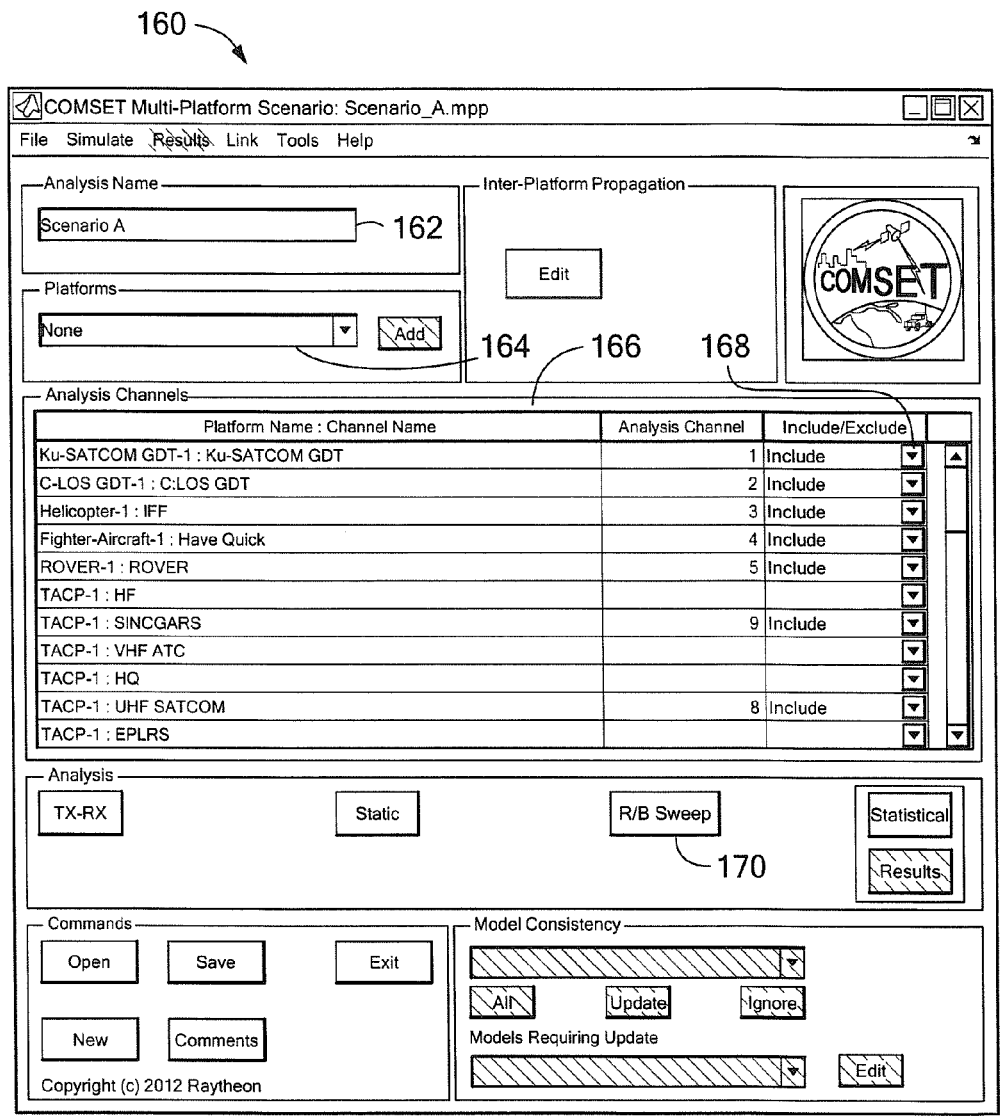
FIG. 11 is a screen shot of an example GUI screen that may be used in connection with a Multi-Platform Scenario application in accordance with an implementation.

As described above, Multi-Platform Scenario application 66 of FIG. 3 allows a user to select multiple platforms for use in an energy-on-target analysis. FIG. 11 is a screen shot of an example GUI screen 160 that may be used in connection with Multi-Platform Scenario application 66 in accordance with an implementation. As illustrated, GUI screen 160 may include an "analysis name" text box 162 to allow a user to enter a name for a given analysis. Platforms may be added to the analysis from a "platforms" pull-down menu 164. An "analysis channels" section 166 of GUI screen 160 may list a number of radio channels that may be added to a platform for analysis. Radio channels can be included or excluded using an include/exclude pull-down menu 168 associated with the radio channel. Each platform can have one or more radio channels associated with it. As described previously, for an energy-on-target analysis, at least one selected platform model must contain a radio transmitter and at least one platform model must contain a radio receiver. GUI screen 160 for Multi-Platform Scenario application 66 may include an "RIB Sweep" button 170 to allow a user to specify a range/bearing sweep analysis to be performed. Selection of the "RIB Sweep" button 170 may open the "Range/Bearing Sweep Analysis" application 68 of FIG. 3.

Figure 12:
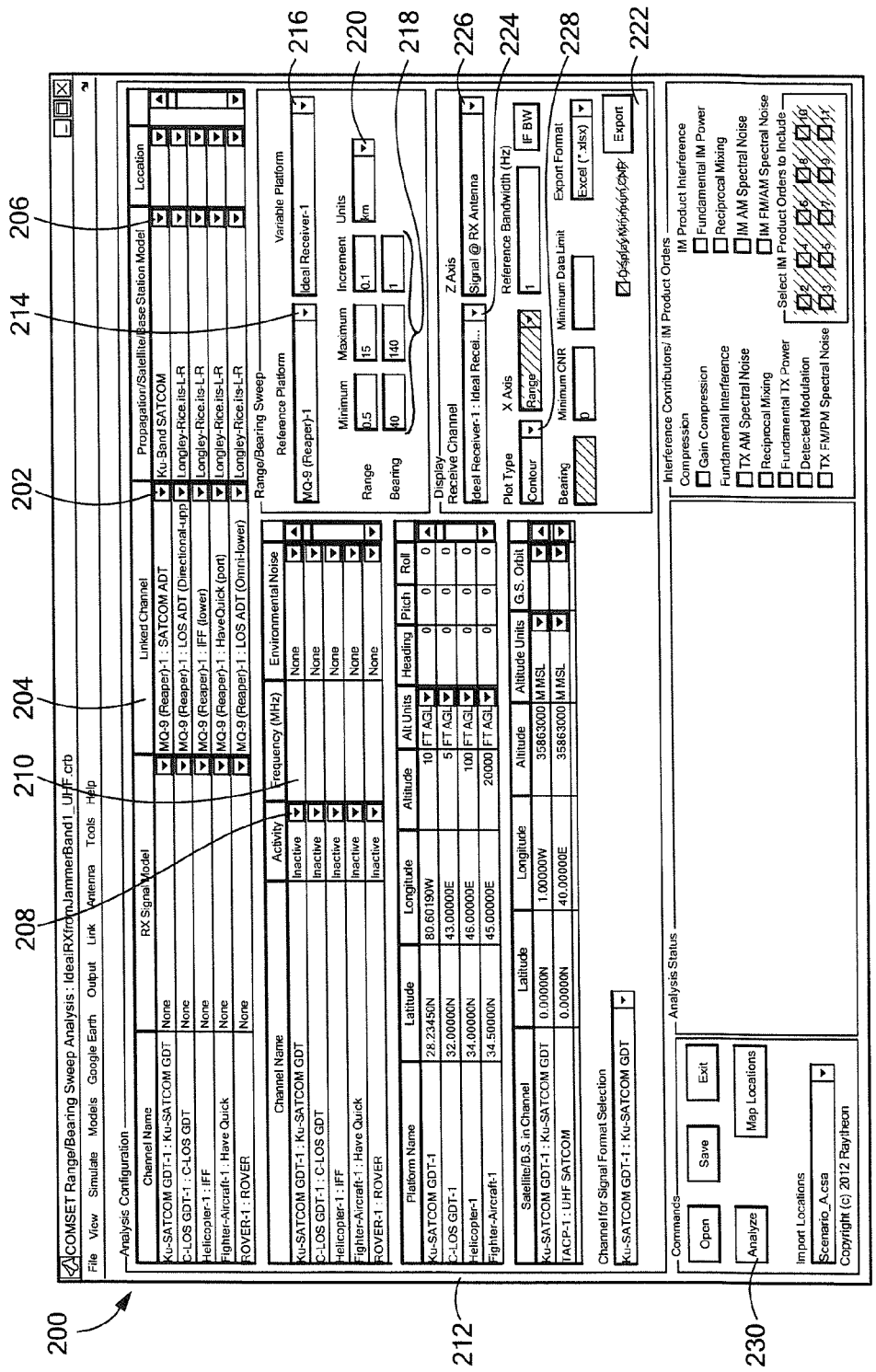
FIG. 12 is a screen shot of an example GUI screen that may be used in connection with a range/bearing sweep analysis application in accordance with an implementation.

FIG. 12 is a screen shot of an example GUI screen 200 that may be used in connection with Range/Bearing Sweep Analysis application 68 in accordance with an implementation. As shown in FIG. 12, GUI screen 200 may allow a user to link a receive channel to a transmit channel by selecting the transmit channel from a pull-down menu 202 under a "Linked Channel" category 204. A propagation model may also be selected using a pull-down menu 206. For each of the listed channels, a corresponding activity (i.e., inactive, transmit, or receive) may be selected from a pull-down menu 208. An operating frequency may also be entered in a text box 210.

For each platform that is part of the energy-on-target analysis, a platform location (e.g., latitude, longitude, and altitude) and attitude (e.g., heading, pitch, and roll) may be entered in corresponding fields 212. A reference platform may be selected using a reference platform pull-down menu 214 and a variable platform may be selected using a variable platform pull-down menu 216. The reference platform will remain stationary during the sweep analysis and the variable platform will be moved during the sweep analysis. Typically, the transmitter platform will be used as the stationary platform and the receiver platform will be used as the variable platform to generate the energy-on-target information.

The specifics of the sweep to be performed may next be entered by the user. In general, any type of information may be entered by the user to define the points at which receive power or energy are desired. In GUI screen 200 of FIG. 12, for example, text boxes 218 are provided for entering a minimum range, a maximum range, a range increment, a minimum bearing, a maximum bearing, and a bearing increment. A pull-down menu 220 may be provided to allow a user to specify the units of the range information.

GUI screen 200 of FIG. 12 also includes a display section 222 to allow a user to define the information to be plotted. As illustrated, display section 222 may include a receive channel pull-down menu 224 to define a type of receive channel to use in the analysis and a Z-Axis pull down menu 226 to define the parameter to plot on the z-axis on the resulting graph. For an energy-on-target analysis, an ideal receiver is typically selected as the receive channel type and the signal level at the receive antenna is typically selected as the parameter to plot. A "Plot Type" pull-down menu 228 may also be provided to allow a user to specify a type of plot to be generated. For an energy-on-target analysis, a contour plot is typically selected as a plot type. After the plot type has been selected, a user may press an "Analyze" button 230 to initiate the simulation.

Figure 13:
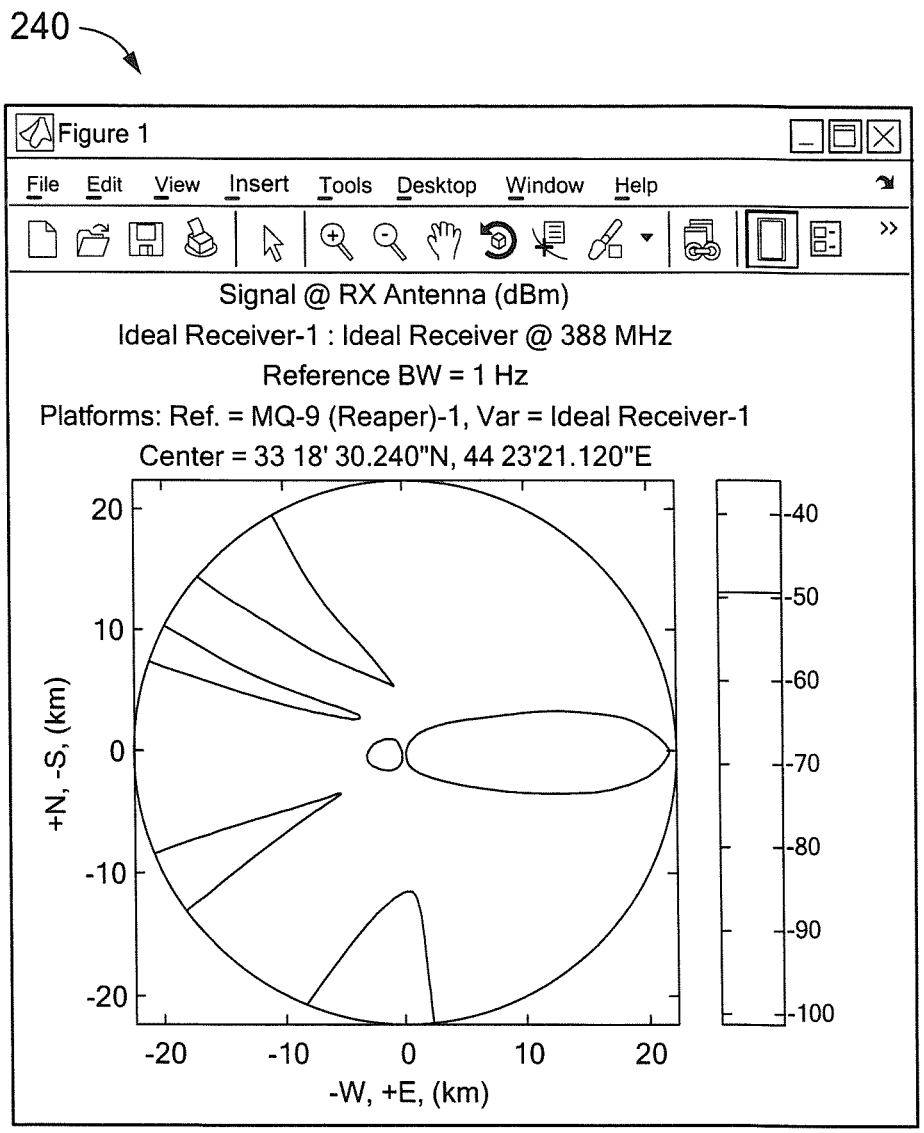
FIG. 13 is a screen shot of an example plot of energy-on-target information resulting from an energy-on-target analysis in accordance with an implementation.

FIG. 13 is a screen shot of an example plot 240 that may be generated as a result of an energy-on-target analysis in accordance with an implementation. The plot 240 shows the received signal level at the antenna of the receiver platform as it was moved about the sweep area. A color scheme may be used in various embodiments to illustrate the magnitude of the signal level at different locations within the swept region. In some implementations, functionality may be provided for overlaying the generated plot 240 on an electronic map of the covered region (e.g., a Google Earth map, etc.). As shown, plot 240 is not limited to specifying received signal level within a beam width of a main beam of the antenna pattern of the transmitter platform. On the contrary, the plot may provide information for a much larger region about the main beam.

As described above, to perform an energy-on-target analysis, one platform model needs to be selected that includes a transmitter channel and another platform model needs to be selected that includes a receiver channel. Referring back to FIG. 12, when a transmitter channel is selected for one of the platforms in the Range/Bearing Sweep Analysis application 68, 200, a transmitter model provides an output power spectral density for the transmitter channel and an antenna model provides a 3-dimensional gain pattern, including polarization characteristics, for the channel. The transmitter channel may include data at all operating frequencies in some implementations. The orientation of the transmit antenna may be set relative to the platform orientation by, for example, the Range/Bearing Sweep Analysis application 68. This may be accomplished by rotating the antenna gain pattern and polarization about the x, y, and z axes using a 3-dimensional rotation matrix. Rotation of the antenna gain pattern may be accomplished, for example, by applying the following series of equations. For rotation about the z-axis in the x-y plane:

$$x_z = x \cdot \cos(\alpha_z) + y \cdot \sin(\alpha_z)$$

$$y_z = -x \cdot \sin(\alpha_z) + y \cdot \cos(\alpha_z),$$

for rotation about the y axis in the x-z plane:

$$x_y = x_z \cdot \cos(\alpha_y) - z \cdot \sin(\alpha_y)$$

$$z_y = x_z \cdot \sin(\alpha_y) + z \cdot \cos(\alpha_y), \text{ and}$$

for rotation about the x axis in the y-z plane:

$$y_x = y_z \cdot \cos(\alpha_x) + z_y \cdot \sin(\alpha_x)$$

$$z_x = -y_z \cdot \sin(\alpha_x) + z_y \cdot \cos(\alpha_x)$$

where $\alpha$ is the angular rotation in radians. These same equations may be applied to the polarization rotation after converting the complex orthogonal directivities from spherical coordinates to Cartesian coordinates. The data provided from this platform, which includes a transmit channel, may include an Effective Isotropic Radiated Power (EIRP). The EIRP may be calculated using the following equation:

$$\text{EIRP}(x,y,z) = G_t(x,y,z) \int_{-\infty}^{\infty} P_c(\Delta f) \cdot \delta \Delta f$$

where $G_t(x,y,z)$ is the transmit antenna gain at each receiver location (unitless) and $P_c(\Delta f)$ is the transmit power spectral density (W/Hz).

As with the transmitter platform model discussed above, when a receiver channel is selected for the other platform in the Range/Bearing Sweep Analysis application, an orientation of a receive antenna may be set relative to the corresponding platform orientation. The orientation of the receive antenna may be set using, for example, the same rotation equations used for the transmit antenna orientation.

As described above, to perform an energy-on-target analysis, the variation of the range and bearing of the receiver platform may first be input to the Range/Bearing Sweep Analysis application 68, 200. The "Analyze" button 222 (FIG. 12) may then be pressed to begin the simulation. During the simulation, the power at the receive antenna output may be calculated and stored in memory as a function of range and bearing (or receiver location). In at least one implementation, the received power level may be calculated using the following equation:

$$P_r(x, y, z) = \frac{EIRP(x, y, z)G_r(x, y, z)}{L_p(x, y, z)P_L(x, y, z)}$$
$$= \frac{P_t G_t(x, y, z)G_r(x, y, z)}{L_p(x, y, z)P_L(x, y, z)}$$

where EIRP(x,y,z) is the Effective Isotropic Radiated Power at each receiver location (Watts), $L_p(x,y,z)$ is the propagation loss at each receiver location (unitless), $P_L(x,y,z)$ is the polarization loss at each receiver location (unitless), $G_r(x,y,z)$ is the receive antenna gain at each receiver location (unitless), $P_t$ is the transmit power (Watts), and $G_t(x,y,z)$ is the transmit antenna gain at each receiver location (unitless). The polarization loss may be calculated using the following equation:

$$P_L = \left[\cos^2\left(\frac{P_a P_w}{2}\right)\right]^{-1}$$

where PaPw is the great circle angle between the wave polarization and antenna polarization on a Poincare' Sphere given as:

$$PaPw=\cos^{-1}[\cos(2\gamma_w)\cos(2\gamma_a)+\sin(2\gamma_w)\sin(2\gamma_a)\cos(\delta_w-\delta_a)]$$

where $\gamma_w$ is the transmitted wave vector angle at the receive antenna for the orthogonal components of the electric field, $\delta_w$ is the phase difference between orthogonal components of the transmitted wave at the receive antenna, $\gamma_a$ is the receive antenna vector angle for the orthogonal components of the electric field, and $\delta_a$ is the phase difference between the orthogonal components of the receive antenna.

As described above, in a typical energy-on-target analysis, the location and attitude of the transmit platform may remain stationary and the location of the receive platform may change. To generate information for other transmit platform locations, the specified platform location and/or attitude may be manually changed by a user and the analysis repeated. In at least one implementation, a user is able to enter sweep information for the transmit platform location and/or attitude in a similar manner to the receive platform information. When a user subsequently initiates the analysis, the displayed results may update as the transmit platform location and/or attitude changes. In some implementations, a GUI control such as a scroll bar or slider (or a similar physical control device) may be provided to allow a user to scroll through a series of transmit platform locations or attitudes and watch how the displayed results change.

In some implementations, the techniques and systems described herein may be used during a system design phase to optimize antenna performance. For example, if a transmitter design (e.g., a jammer) is to be installed on an aircraft with a directional antenna pointed toward the ground, the signal level on the ground as a function of receiver location can be displayed. An area on the ground may be defined by receive signal levels above a specific threshold. The signal level threshold may determine the maximum communication range between two specific threat radios on the ground. In other words, when a threat receiver is inside the coverage area, the threat transmitter must be closer than the range defined by the signal level threshold to establish a communication link. By evaluating this coverage area, the antenna gain, beamwidth, sidelobe levels, pointing angle, and jammer range can be optimized. This data may also be used to assist a designer in defining system level requirements. In some applications, the techniques and systems described herein may be used during real world operations to determine energy levels that are impinging on an area of interest. For example, in one possible application, energy-on-target information may be provided to an operator during a military operation to ensure that appropriate RF coverage is maintained during the operation.

In the description above, the energy-on-target techniques and systems are described in the context of a transmitter platform transmitting toward a receiver platform. In one possible scenario, an airborne transmitting platform (e.g., an aircraft, etc.) will illuminate a ground region that includes a receiver platform. It should be understood that the described techniques and systems also have application in many other scenarios. In fact, the techniques and systems may be used for any combination of platforms and locations. For example, in one possible scenario, a transmitter platform for use in a jamming application may be located on the ground and a receiver platform (e.g., a target) may be located in the sky. In such a scenario, the coverage area may be at, for example, a specific altitude in the sky.

In the description above, various GUI screens are described that may be used to facilitate the entry of user selections, specifications, and/or input data from a user in connection with an analysis to be performed. It should be understood that these specific screens are not meant to be limiting and other alternative information entry techniques and/or structures may be used in other implementations. These other techniques and structures may include both GUI based and non-GUI based approaches.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A machine-implemented method for simulating energy-on-target in a targeted region for a radio transmission system, comprising:
   receiving input information specifying a transmitter platform model to be used as a transmitter for an energy-on-target analysis;
   receiving input information specifying a receiver platform model to be used as a receiver for the energy-on-target analysis;
   receiving input information specifying a propagation model to be used for a channel between the transmitter and the receiver for the energy-on-target analysis;
   receiving input information specifying a number of receiver locations for which energy-on-target information is desired; and
   performing a series of link analyses for the number of receiver locations using the transmitter platform model, the receiver platform model, and the channel propagation model, wherein each link analysis in the series of link analyses determines a receive power level at a corresponding receiver location taking into consideration transmit power level, transmit and receive antenna gain at the corresponding receiver location, propagation power loss in the channel, and polarization loss at the corresponding receiver location.

2. The method of claim 1, further comprising:
generating a plot using results of the series of link analyses.

3. The method of claim 2, further comprising:
receiving input information specifying a plot type before generating the plot, wherein generating a plot includes generating a plot having the specified plot type.

4. The method of claim 1, wherein:
receiving input information specifying a number of receiver locations for which energy-on-target information is desired includes receiving a minimum range indication, a maximum range indication, a range increment indication, a minimum bearing indication, a maximum bearing indication, and a bearing increment indication.

5. The method of claim 1, wherein:
receiving input information specifying a transmitter platform model to be used as a transmitter for an energy-on-target analysis includes receiving a user selection from a list of transmitter platform models.

6. The method of claim 1, wherein:
receiving input information specifying a receiver platform model to be used as a receiver for the energy-on-target analysis includes receiving a user selection from a list of receiver platform models.

7. The method of claim 1, wherein:
a location of the transmitter is held constant during the series of link analyses.

8. The method of claim 1, further comprising:
generating a transmitter platform model for use during an energy-on-target analysis based on user input information, wherein generating a transmitter platform model includes:
receiving input information specifying a transmitter model;
receiving input information specifying a transmit antenna model;
receiving input information specifying a location of a transmitter platform;
receiving input information specifying an attitude of the transmitter platform;
orienting the transmit antenna model with respect to the transmitter platform to generate an oriented transmit antenna model;
calculating an Effective Isotropic Radiated Power (EIRP) for the transmitter platform model using the transmitter model and the oriented transmit antenna model; and
orienting the transmitter platform model with respect to a surrounding area based on the input information specifying a location of the transmitter platform and the input information specifying an attitude of the transmitter platform.

9. A system to simulate energy-on-target in a targeted region for a radio transmission system, comprising:
one or more processors to:
receive input information from a user specifying a transmitter platform model and a receiver platform model for an energy-on-target analysis;
receive input information from a user specifying a propagation model to be used for a channel between a transmitter platform and a receiver platform for the energy-on-target analysis;
receive input information from a user specifying a location and attitude of the transmitter platform for the energy-on-target analysis;
receive input information from a user specifying a plurality of receiver platform locations for the energy-on-target analysis; and
perform a series of link analyses for the plurality of receiver platform locations using the specified transmitter platform model, the specified receiver platform model, and the specified channel propagation model, wherein each link analysis in the series of link analyses determines a receive power level at a corresponding receiver platform location taking into consideration transmit power level, transmit and receive antenna gain at the corresponding receiver platform location, propagation power loss in the channel, and polarization loss at the corresponding receiver platform location; and
a memory to store results of the series of link analyses.

10. The system of claim 9, wherein:
the one or more processors include at least one processor to plot results of the series of link analyses.

11. The system of claim 9, further comprising:
a model database to store one or more of: platform models, receive RFD datasets, transmit datasets, antenna models, radio models, propagation models, and channel parameter models.

12. The system of claim 9, wherein:
the one or more processors include at least one processor to generate a platform model for use in energy-on-target analyses, the at least one processor to allow a user to specify a platform name for the platform model and to specify at least one receive RFD dataset and/or at least one transmitter dataset for the platform model.

13. The system of claim 12, wherein:
the at least one processor is configured to allow a user to specify channel parameters for the platform model, wherein the channel parameters include one or more operational characteristics of a corresponding receive RFD dataset or transmit dataset associated with the platform model.

14. The system of claim 12, wherein:
the at least one processor is configured to allow a user to specify an antenna coupling model for the platform model.

15. The system of claim 9, wherein:
the one or more processors include at least one processor to generate radio models for use in energy-on-target analyses, wherein a radio model can include one or more of: transmitter modulation spectrum information, output power information, thermal noise information, receiver noise figure information, RF and pre-detector selectivity information, $3^{rd}$ order intercept power information, and phase noise information.

16. The system of claim 9, wherein:
the one or more processors include at least one processor to generate antenna models having three dimensional gain patterns for use in energy-on-target analyses.

17. The system of claim 16, wherein:
the at least one processor to generate antenna models can generate antenna models using one or more of: theoretical antenna patterns, data imported from electromagnetic simulator programs, and measured data.

18. The system of claim 9, wherein:
the one or more processors include at least one processor to add and/or modify receive radio frequency distribution (RFD) datasets for use in energy-on-target analyses.

19. The system of claim 9, wherein:
the one or more processors include at least one processor to add and/or modify transmit datasets for use in energy-on-target analyses.

20. A system to simulate energy-on-target in a targeted region for a radio transmission system, comprising:
means for receiving input information specifying a transmitter platform model to be used as a transmitter for an energy-on-target analysis;
means for receiving input information specifying a receiver platform model to be used as a receiver for the energy-on-target analysis;
means for receiving input information specifying a propagation model to be used for a channel between the transmitter and the receiver for the energy-on-target analysis;
means for receiving input information specifying a number of receiver locations for which energy-on-target information is desired; and
means for performing a series of link analyses for the number of receiver locations using the transmitter platform model, the receiver platform model, and the channel propagation model, wherein each link analysis in the series of link analyses determines a receive power level at a corresponding receiver location taking into consideration transmit power level, transmit and receive antenna gain at the corresponding receiver location, propagation power loss in the channel, and polarization loss at the corresponding receiver location.

21. The system of claim 20, further comprising:
means for generating a plot using results of the series of link analyses.

22. The system of claim 20, wherein:
the means for receiving input information specifying a number of receiver locations for which energy-on-target information is desired includes means for receiving a minimum range indication, a maximum range indication, a range increment indication, a minimum bearing indication, a maximum bearing indication, and a bearing increment indication.

* * * * *